Feb. 9, 1943.  J. B. RICKER  2,310,598
DELINTER
Filed Feb. 12, 1942  2 Sheets-Sheet 1

INVENTOR.
JOHN B. RICKER
BY  *J. H. Weatherford*
ATTY

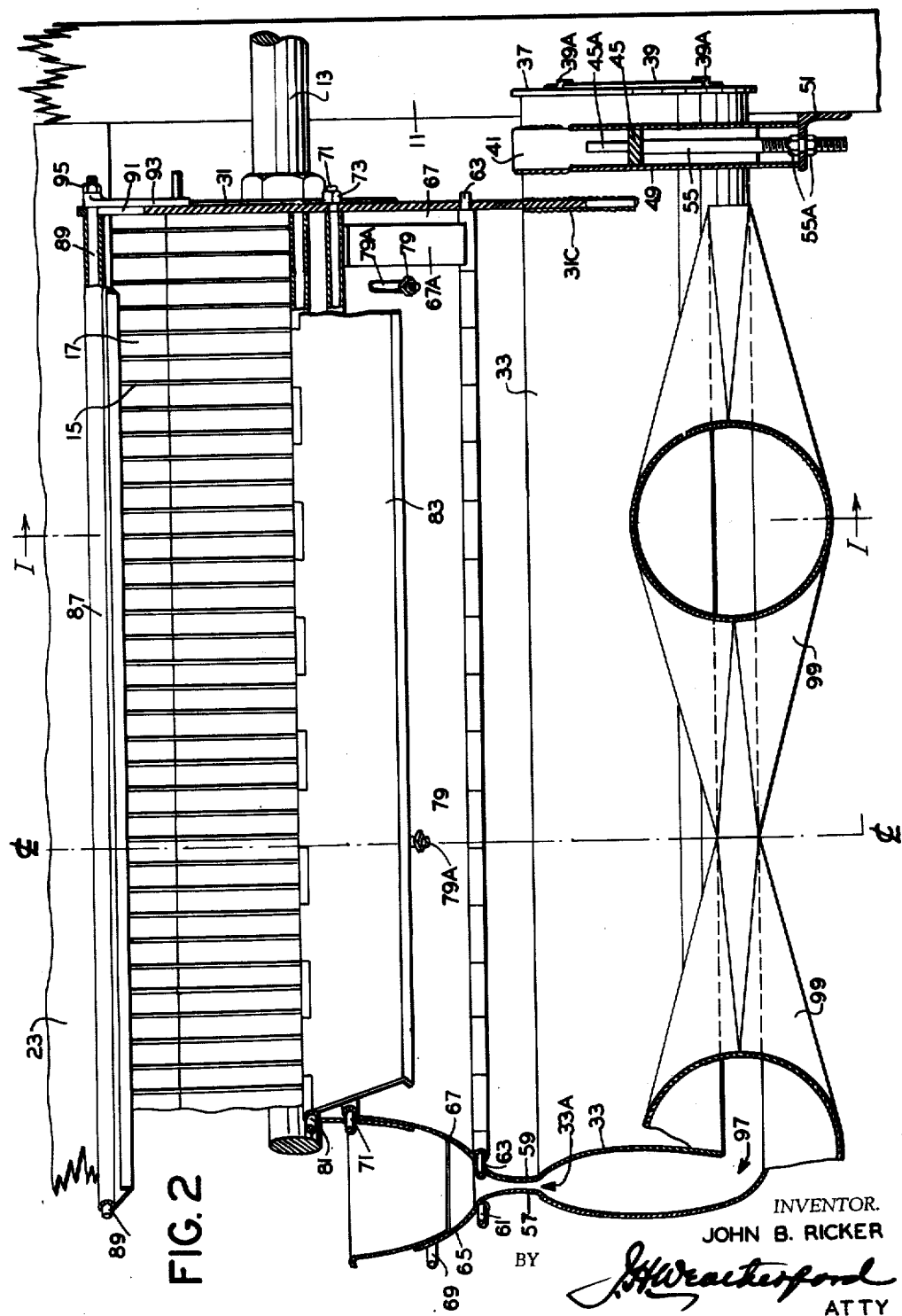

Patented Feb. 9, 1943

2,310,598

UNITED STATES PATENT OFFICE 2,310,598

DELINTER

John B. Ricker, Memphis, Tenn.

Application February 12, 1942, Serial No. 430,577

10 Claims. (Cl. 19—41)

This invention relates to improvements in delinters, such as are used in oil mills prior to crushing the seed, and particularly to delinters of the saw type which remove the residual linters from the cotton seed after the seed has been subjected to ordinary ginning and the long cotton fiber removed.

The present application is a continuation in part of my pending application, Serial No. 375,391, filed January 22, 1941.

Since the invention by Whitney of the cotton gin the cotton fiber has been removed from the seed by saws having sharply pointed arcuate teeth with under-cut throats, which teeth hook into the fiber and pull it off the seed, leaving a considerable amount of lint from which the longer fibers are broken off and also a certain amount of fuzz too short for engagement by the saws.

Cotton fiber or lint removed from the seed by the delinter saws engages rather firmly in the throat of the saw teeth, and brushes revolving at a much higher rate of speed than the saws are largely used for dislodging the fiber from the saws, the fiber removed being thrown outward from the gin by the brush action. Attempts also have been made to substitute for the brush high pressure air currents impinging tangentially along the line of movement of the saw teeth to dislodge and carry away the fiber, and similarly vacuum action has been tried to establish a high speed current for withdrawing the fiber from teeth throats and discharging it from the gin.

Subsequent to ginning, delinters of various types are used for cutting off the linters left on the seed after the ginning. At the present time these devices are largely of the saw type, differing primarily from the gin in that the teeth of the saws are straight, though usually not radial, and are of rectangular cross section providing cutting surfaces, and provide little resistance to the discharge of the lint by centrifugal force, and substantially none to the release of heavier particles of trash and motes. Even so the linters are so light that assistance is necessary to accomplish their removal, and it has been assumed that brushes or high speed pressure air currents must be used. These devices remove the linters, and with them the trash, but they intermix the materials and create such turbulence as to carry substantially all of the motes and trash away with the linters and so reduce the quality of the linters collected as to require subsequent troublesome and expensive processes for cleaning.

My previous application disclosed a device in which the heavier particles, such as motes and trash, plummeted through a floating mass of lint, the separation thus accomplished being a substantial advance in desired separation.

The objects of the present device are:

To provide means and methods for first removing the trash and motes from the saws and subsequently removing the linters;

To provide means for accomplishing the removal and separation which takes advantage of centrifugal force for removing the trashy heavier materials, and inherently therewith minor portions of the lint, and subsequently removing the remaining major portion of the lint and concurrently accomplishing the recapture of these lighter materials and their removal and collection with the major portions of the lint and delivery thereof.

To provide means for adjusting the removal apparatus to conform certain portions thereof to the saws as they are reduced in diameter from time to time by sharpening, and to independently adjust portions of the apparatus to conform it to varying conditions, as of moisture content, and amount and nature of the heavier particles which are to be allowed to discharge independently of the lint removal.

Further objects are:

To improve the design and construction of such apparatus.

Primarily these objects are accomplished by establishing a discharge opening through which the heavier particles may be directly discharged by centrifugal force and means in connection therewith for controlling the size and positioning of the opening relative to the saws, and the direction of the controlling surfaces extending from such opening; and in connection with such controlled opening establishing therebelow and thereafter in discharge sequence, a passageway conforming closely to the contour of the saws through which air is drawn through a suitable opening positioned to establish air currents augmenting those set up by the saws and opposing air currents meeting the first currents of such opening and opposing those set up by the saw.

The means by which the foregoing and other objects are accomplished and the method of their accomplishment will readily be understood from the following specification upon reference to the accompanying drawings, in which:

Fig. 2 is a partial rear elevation with the extreme right side of the view in section on the line II—II of Fig. 1.

Figure 1:
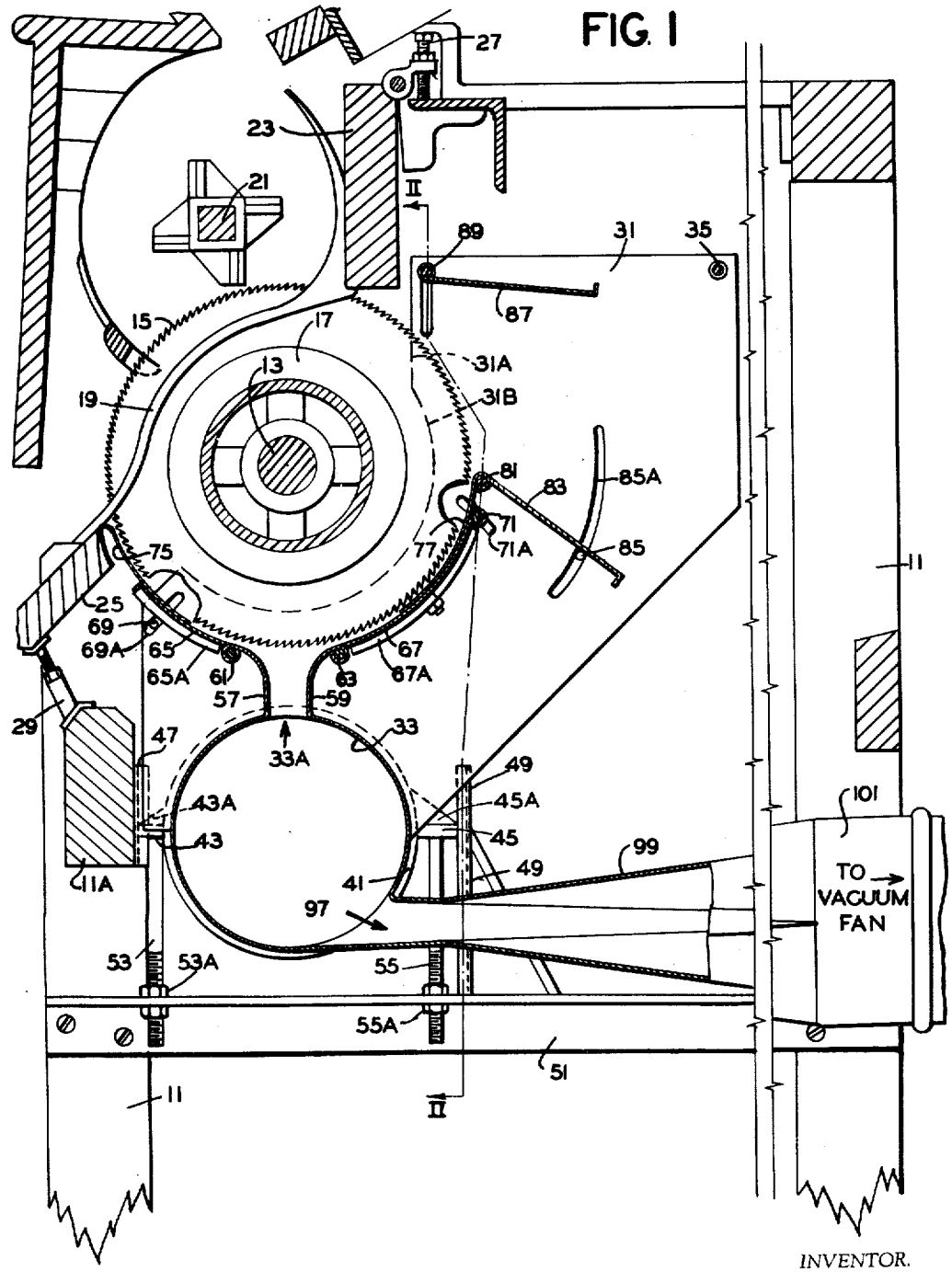
Fig. 1 is a cross section of the device taken as on the line I—I of Fig. 2.

Referring now to the drawings in which the various parts are indicated by numerals:

11 are frame parts of the delinter, 13 a saw shaft on which are mounted a bank of saws 15, spaced apart as by collars 17, ordinarily one hundred and five or one hundred forty-one saws being used. 19 are ribs which lie between the saws and hold back the seed so that the linters may be stripped from them. 21 is a shaft having blades disposed in adjacency to the saws and ribs to create in the seed a "roll," such as inherently set up in a gin by the cotton itself. This roll is mounted in a breast box which includes longitudinally disposed members 23 and 25, respectively vertically adjustable as by screws 27, (one only shown) and downwardly inwardly adjustable by screws 29 (one only shown), whereby the ribs may be lowered and inwardly moved at such times as the saw teeth are sharpened and the diameter of the saws thereby reduced, in order to maintain proper extension of the saws through and beyond the ribs; all of such parts, including the adjusting means, being commonly a part of usual delinters.

Disposed at opposite ends of the bank of saws are plates 31 (one only shown) which overlap the end saws of the bank and extend rearwardly and downwardly therefrom. The upper front portions of these plates are cut away, as along the lines 31—A, 31—B, to lie behind the breast box member 23, and rearwardly and beneath the collars 17 on the saw arbor, the lower portion of the plates, along the cut away line 31—B, being so spaced below the collars as to permit subsequent adjustment of the plates relatively to the saws. The bottom portions of these plates extend forward into adjacency with the forward edges of the saws and underlie the end collars holding the saws. 33 is an air flue, preferably of circular cross section which is disposed lengthwise beneath the bank of saws and preferably at its opposite ends extends beyond the plates 31, the plates in such case arcuately embracing, and resting on, the upper portion of the flue and being preferably rigidly secured thereto as by welding. The end plates additionally are rigidly spaced and braced, as by a rod 35 extending from plate to plate, and rigidly secured at its respective ends to said plates.

The opposite ends of the air flue are closed by heads, as the head 37, which may be solid or if desired provided with a shutter 39 slidably disposed in guideways 39—A.

Adjacent its opposite ends the flue is preferably encircled by flat stiffening bands, as the band 41, secured to the flue, preferably as by welding, and is provided with laterally extending ears 43, 45, secured preferably to the bands, as by welding, and suitably braced as by gussets 43—A, 45—A respectively, similarly secured to the bands. The projecting ends of the ears are respectively slidably mounted in suitable vertically disposed guideways 47 and 49, preferably channels, the channel 47 being shown supported and braced by a frame part 11—A and the channel 49 by a transversely disposed angle iron 51 which in turn is secured to the frame parts 11. Secured as by welding to, and extending downward from, the ears, are supporting and adjusting rods 53, 55, which extend through suitable openings in the horizontal leg of the angle 51 and are threaded to receive nuts 53—A, 55—A through which support by, anchorage to, and adjustment vertically relatively to, the angle iron is accomplished.

The flue 33 is longitudinally apertured at 33—A, substantially from end plate to end plate, the slot being disposed substantially vertically below the saw shaft 13. Extending upward from opposite sides of the slot are walls 57, 59 which extend from end plate to end plate and establish therewith a longitudinally disposed upwardly extending air channel. The upper edges of these channel walls flare respectively outward to hinge pins 61, 63, which extend through the walls 31. The pins respectively hingedly connect the walls 57, 59, to wing plates 65, 67, arcuately curved to conform more or less closely around the saws. These wing plates extend from end wall to end wall and may be stiffened from time to time as by conformingly curved stiffeners 65—A, 67—A. From the hinge pins they extend arcuately outward and upward, the plate 65 being supported additionally by a rod 69 extending through end plate slots, as the slot 69—A, concentric with the hinge pin 61, and the plate 67 by a rod 71 extending through end plate slots, as the slot 71—A, concentric with the hinge pin 63, the rods being clamped to support the wings in adjusted positions as by the nut 73, (Fig. 2).

The wings have slidably disposed arcuate wing extensions 75, 77 respectively, which are adjustably secured to their respective wings as by the bolts and nuts 79, (Fig. 2) shown extending from the wing extensions 77 through slots 79—A in the wing 67.

The wing extension 77 carries at its upper edge a horizontally disposed pin 81, which because of necessary adjustments, preferably does not extend through the end walls. This pin serves as a hinge pin for a wing flap 83 which extends adjustably rearwardly and may be supported additionally by a rod 85 extending through end plate slots, as the slot 85—A, (Fig. 1) and is clamped in similar manner to the rod 71.

Vertically spaced above the wing flap 83 is an upper flap 87 which is mounted on, and preferably rigidly secured to, a rod 89, having its ends extending through vertically disposed slots, as the slot 91, in the end plates. This rod may be provided with an adjusting arm 93 exterior to the plate through which adjustment of the angularity of the flap can be readily effected. Holding of the flap in adjusted position is effected as by tightening nut 95 to effect frictional holding. Obviously the hub of the arm 93 must be slidable along the rod 89, the rod and hole in the hub preferably being square to permit sliding and yet effect turning.

The wing flap 83 and upper flap 87 cooperate with the end walls 31 to establish the discharge opening through which the heavier particles are discharged from the saws and by virtue of their adjustability accomplish the proper positioning of the top and bottom edges of the opening. Also by virtue of the angular additional adjustment they cooperate to establish a rearwardly open chamber in which it is definitely possible to recapture at least a major portion of the lint carried away from the saws by the heavy particles.

The air flue 33 is additionally longitudinally apertured at the bottom to provide an opening 97 through which the lint is withdrawn from the flue. To effect this withdrawal one or more suction flues 99, two here being indicated, are provided, which flues each respectively diverge in vertical dimension and converge in horizontal dimension into a tubular section 101, here shown as circular, these tubular sections being connected in suitable manner as to a vacuum fan or fans of well known type, not here shown. Preferably the bottom portions of the suction flues 99 lead tangentially and substantially horizontally rearward from the bottom of the air flue 33.

In fabricating the structure the air flue 33, preferably of sheet metal, circular in cross section, and of a length greater than the over-all length of the bank of saws is constructed, the ends of this flue being closed by heads, either solid or with shutter closed openings as desired. A rectangular opening slightly longer than the overall length of the bank of saws is cut out longitudinally along what is to be the top of the flue, and an additional longitudinal opening of substantially the same length is cut out in the bottom of the flue, one edge of this latter opening being substantially diametrically opposite the center line of the other opening. Both of these openings preferably extend continuously along the air flue, but if it be found advisable may be interrupted from time to time by bridging members, not shown, which would preserve the continuity of the flue wall across the opening or openings.

The two end plates 31, usually of considerably heavier metal, are arcuately cut out to conformingly fit over the upper portion of the flue, these arcuate cuts preferably being substantially semicircular. The end plates are also cut away arcuately about centers which are substantially vertically above the centers of the lower cuts, these latter arcuate cuts 31—B, each having a radius somewhat greater than the radius of the collars 17 of the saw arbor. The plates are also cut away along lines 31—A extending vertically upward from these arcuate cuts in order to avoid interference with the member 23 of the breast box. The two end members are seated on the upper portion of the air flue adjacent and usually flush with the ends of the upper slot and are securely welded to the flue. Additionally the plates are braced apart by the rod 35.

Either before or after assembling, bands 41 preferably are conformed around and secured to the flue, as by welding, outside of the end plates. Adjacent the level of the center of the flue the ears 43 and 45 are welded to the bands 41 so as to extend substantially horizontally outward therefrom, these ears preferably being stiffened by the gussets 43—A, 45—A, also securely welded both to the ears and the bands.

The supporting rods 53, 55 having their lower ends threaded are secured to the underside of the ears, ordinarily by welding, so that they will project vertically downward therefrom. Supporting members, ordinarily angle irons, are apertured for the lower ends of these rods and are secured to frame members of the delinter, the usual delinters ordinarily having such members admirably adapted thereto. The vertically disposed guideways 49 for the ears 45 are secured and braced to the upper side of the supporting member, and, should space permit or require, similar guideways are erected for the ears 43. Ordinarily, however, space conditions make it more convenient to secure the guideways 47 for the ears 43 to the frame member 11—A of the delinter. The upper ones of the nuts 53—A, 55—A are placed on the rods 53, 55. The ears 43 and 45 are placed in their respective guideways and the rods through the openings in the support therefor, and the under ones of the nuts 53—A, 55—A put on the rods to hold them down.

Either before or after assembling in the delinter the suction flues 99 are fabricated and secured around the lower opening or openings in the air flue in position to extend rearwardly beyond the back of the delinter frame. Also the walls 57, 59 are secured along the opposite edges of the upper slot and to the end walls to form the upwardly extending air channelway.

The wing plates 65 and 67 are arcuately curved in cross section to a radius substantially equal to or slightly less than the radius of the saws when new, and are hingedly connected, by insertion of the pins 61 and 63, to the channel walls 57, 59. The wing extensions 75, 77 are arcuately curved to fit the inside surfaces of the wing plates and are adjustably attached thereto by the bolts and nuts 79. The wing flap 83 is hingedly secured through the pin 81 to the upper edge of the wing extension 77. The upper wing flap 87 is disposed between the end plates and the pin 89 placed to support it, and the additional supporting rods 69, 71, and 85 placed.

It will be understood that the sequence of assembly and erection in the delinter of the various parts is not intended necessarily to be that followed in accomplishing this structure, but may be varied as conditions indicate or require, and that modifications in many of the parts may be necessary to conform the structures to varying design of the delinters with which they are to be used, or may otherwise be found advantageous.

In use the nuts 53—A, 55—A are adjusted to bring the upper edges of the walls 57 and 59 into adjacency with the saws. The wing plates 65, 67 and their extensions 75, 77 are adjusted into similar proximity with the saws, the supporting rods 69 and 71 being moved and clamped to hold the wing plates in position. The extension 75 is adjusted inward or outward, as the case may be, to overlie the member 25 of the breast box. Wing extension 77 is likewise adjusted to bring the forward edge of the flap 83 defining the lower edge of the centrifugal-discharge opening substantially level with the center of the saw arbor and the upper flap 87 is adjusted to bring its forward edge to substantially the level of the lower edge of the breast box member 23 with its rear edge extending slightly downward therebelow. Likewise the rear edge of the flap 83 is adjusted, ordinarily to relatively somewhat diverge the two flaps rearwardly and the apparatus is ready to be placed in use.

When the delinter has been started and is in operation the motes and other heavier parts are thrown rearwardly by centrifugal force dislodging and rearwardly diverting a certain percentage of the lint, but allowing by far the larger portion of the lint to continue movement with the saw. The air withdrawn through the passageway established by the wing extension 75 and the wing plate 67 in connection with the saws and collars 17 is drawn through the passageway between the channel walls 57 and 59 into the air flue and from the air flue through the suction flue materially assisting the major portion of the lint to follow around with the saws and into the air flue. Also the much larger channel for the air through the open end mote discharge chamber reduces the speed of flow therethrough sufficiently to prevent diversion of the heavier particles, yet leaves it sufficient to recapture the lint which has been diverted by these discharging particles and add it to the lint following the saws.

Concurrently air is drawn in through the channelway established by the extension 75 and the wing plate 65 in direction opposed to the rotation of the saws which successfully checks and prevents to a large extent at least the carrying of any lint by the saws past the channelway leading downward into the air flue.

After operation has been set up the inner edge of the flap 83 is ordinarily raised to reduce the opening for mote discharge, this raising being continued until it is established that further raising would cause motes to be carried in with the lint. After such raising the rear edge of the wing flap 83 is adjusted, usually upward, until a maximum amount of lint is being recaptured from that carried outward by the motes. Adjustment of the rearward edge of the upper flap may be made to reduce the area of the rear opening and at such point increase the speed of inward flow of the air and further retard the escape of lint with the motes.

Ordinarily after the machine has been set for operation no further adjustment is necessary until the saws have been resharpened until their diameter has been appreciably reduced. After such resharpening the air flue may be raised through the medium of the nuts 53—A, 55—A, the wing plates and wing extensions correspondingly moved inward toward the saws. Usually the wing flaps 83 and 87 must also be adjusted.

It will be understood that the wing pins 61 and 63 may be rigidly secured to the wing plates 65, 67 respectively, and provided with adjusting arms corresponding to the arm 93 on the rod 89 and these arms be used in accomplishing the adjustment of these wing plates, and that numerous other variations in detail may be made.

I claim:

1. In a delinter employing a bank of delinting saws, a mote chamber open front and rear, disposed rearwardly of and adjacent said saws, with its forward opening substantially entirely above the level of the center of the saw arbor, said chamber having end walls extending forwardly and downwardly from said chamber opening into embracing adjacency with the outer peripheral edges of the saws, rearwardly of and below said saw arbor; an elongated air flue closed at its ends, disposed in longitudinal alinement with and vertically below said arbor and saws, and an exhaust passageway leading from said flue; said flue having a longitudinal opening extending substantially from one said end wall to the other thereof, side walls extending from end wall to end wall and upward from the opposite sides of said opening into adjacency with the periphery of said saws, and arcuate walls extending from end wall to end wall curving respectively rearwardly and upwardly, and forwardly and upwardly in adjacency with the periphery of said saws, said rearwardly and upwardly extending wall continuing to a junction with the lower wall of said mote chamber; said arcuate walls in cooperation with said end walls and said saw bank forming respectively air passageways leading downwardly and forwardly from said chamber in cooperative relation with the movement of said saws to draw lint from said chamber and saws into said flue, and downwardly and rearwardly in opposed relation to the movement of said saws to oppose movement of lint past said flue opening.

2. A delinter in accordance with claim 1 which includes means for adjusting the level of the forward edge of the lower wall of said mote chamber.

3. A delinter in accordance with claim 1, which includes means for adjusting the rearward edge of the lower wall of said mote chamber relatively to the forward edge thereof.

4. In combination with a delinter employing a bank of delinter saws, a pair of end walls spaced apart to embrace said bank, said walls having edge portions overlapping the rear, and bottom, peripheral portions of said saws; upper and lower wall members spaced apart, cooperatively spanning from end wall to end wall and lying rearwardly of said saws, said wall members being positioned to establish an opening for centrifugal discharge from said saws substantially entirely above the level of the axis of said saws, and said lower wall member extending forwardly into adjacency with the peripheral edges of said saws, an arcuate wall spanning from end wall to end wall extending from the forward edge of said lower wall member, arcuately downward, forward and upward in conforming adjacency to the periphery of said saws to establish a passageway therealong, said arcuate wall being interrupted vertically below the arbor of said saws to form a discharge opening, segregating said passageway into approach and departure positions, a removal passageway leading downward and away from said opening, and means for setting up exhaust flow through said removal passageway to draw in lint through said approach, and substantially prevent escape of lint through said departure passageway.

5. A delinter in accordance with claim 4, which includes means for adjusting the level of the forward edge of said lower wall member.

6. In a delinter employing a bank of delinting saws, a mote chamber open front and rear, disposed rearwardly of and adjacent said saws, with its forward opening substantially entirely above the level of the center of the saw arbor, said chamber having end walls extending forwardly and downwardly from said chamber opening into embracing adjacency with the outer peripheral edges of the saws, rearwardly of and below said saw arbor, an elongated air flue closed at its ends, disposed in longitudinal alinement with and vertically below said arbor and saws, and an exhaust passageway leading from said flue, said flue having a longitudinal opening extending substantially from one said end wall to the other thereof, side walls extending from end wall to end wall and upward from the opposite sides of said opening into adjacency with the periphery of said saws, and arcuate walls extending from end wall to end wall curving respectively rearwardly and upwardly, and forwardly and upwardly in adjacency with the periphery of said saws, said rearwardly and upwardly extending wall continuing to a junction with the formed edge of the lower wall of said mote chamber; said arcuate walls in cooperation with said end walls and said saw bank forming respectively air passageways leading downwardly and forwardly from said chamber in cooperative relation with the movement of said saws to draw lint from said chamber and saws into said flue, and downwardly and rearwardly in opposed relation to the movement of said saws to oppose movement of lint past said flue opening, means for adjusting said arcuate walls radially with respect to said bank of saws, means respectively for independently varying the levels of the forward edges of the lower and upper walls of said air chamber.

7. A device in accordance with claim 6, which includes means for independently varying the levels of the rear edges of said upper and lower air chamber walls relatively each to its respective forward edge.

8. In combination with a delinter employing a bank of delinter saws, walls forming a chamber open front and rear, said walls being positioned to establish an opening for centrifugal discharge from said saws substantially co-extensive with the length of said bank and substantially entirely above the level of the axis of said saws, the lower of said walls extending forwardly into adjacency with the peripheral edges of said saws, walls forming a flue leading from adjacency with the periphery of said bank of saws substantially vertically below the arbor of said saws; wall means in adjacency to, and cooperating with, said bank of saws extending from the forward edge of the lower wall of said chamber, arcuately downward and forward to said flue to establish a lint capturing passageway leading along said saw bank into said flue; additional wall means, in adjacency to and cooperating with said bank of saws, extending arcuately downward and rearward therealong to said flue to establish a lint repelling passageway into said flue, and means for setting up exhaust flow of air through said flue and said lint capturing and lint repelling passageways.

9. In combination with a delinter employing a bank of delinter saws, walls forming a chamber open front and rear, said walls being positioned to establish an opening for centrifugal discharge from said saws substantially coextensive with the length of said bank and substantially entirely above the level of the axis of said saws, the lower of said walls extending forwardly into adjacency with the peripheral edges of said saws, walls forming a flue leading from adjacency with the periphery of said bank of saws below the arbor of said saws; wall means cooperating with said bank of saws extending from the forward edge of the lower wall of said chamber, arcuately downward and forward to said flue to establish a lint capturing passageway along said saw bank into said flue; additional wall means, cooperating with said bank of saws, extending downward and rearward along a substantial arc of said saw bank to said flue to establish a lint repelling passageway into said flue, means for arcuately adjusting the length of said additional wall means to increase or diminish said repelling air flow, and means for setting up exhaust flow through said flue passageway from said lint capturing and lint repelling passageways.

10. In combination with a delinter employing a bank of delinter saws, a pair of end walls spaced apart to embrace the end saws of said bank, said walls having edge portions overlapping the rear and bottom peripheral portions of said end saws; and upper and lower wall members spaced apart, cooperatively spanning from end wall to end wall and lying rearward of said saws, said upper and lower walls being positioned to establish an opening for centrifugal discharge from said saws substantially entirely above the level of the axis of said saws and said lower wall extending forwardly into adjacency with the peripheral edges of said saws; an arcuate wall spanning from end wall to end wall extending from the forward edge of said lower wall, arcuately downward, forward and upwardly in conforming adjacency to the periphery of said saws to establish a passageway therealong, said arcuate wall being interrupted vertically below the arbor of said saws, a passageway leading downwardly and away therefrom, and means for setting up exhaust flow through said latter passageway from said arcuate passageways.

JOHN B. RICKER.